US010817863B1

(12) United States Patent
Rogers et al.

(10) Patent No.: US 10,817,863 B1
(45) Date of Patent: Oct. 27, 2020

(54) FACILITATING LOCATION-BASED SALES VENUE TRANSACTION PAYMENTS USING NON-LOCATION-BASED IDENTITY TARGETS

(71) Applicant: IQMetrix Software Development Corporation, Vancouver (CA)

(72) Inventors: Garett Rogers, Vancouver (CA); Laurent May, Vancouver (CA); Ryan Volberg, Vancouver (CA); Phil Brockmeyer, Vancouver (CA); Zoran Kovacevic, Vancouver (CA)

(73) Assignee: IQMetrix Software Development Corporation, Vancouver (CA)

( * ) Notice: Subject to any disclaimer, the term of this patent is extended or adjusted under 35 U.S.C. 154(b) by 18 days.

(21) Appl. No.: 16/382,066

(22) Filed: Apr. 11, 2019

(51) Int. Cl.
| G06Q 30/06 | (2012.01) |
| G06Q 20/20 | (2012.01) |
| G06Q 20/14 | (2012.01) |
| G06K 19/06 | (2006.01) |

(52) U.S. Cl.
CPC ........ *G06Q 20/206* (2013.01); *G06Q 20/14* (2013.01); *G06K 19/06028* (2013.01); *G06K 19/06037* (2013.01)

(58) Field of Classification Search
CPC ..................................... G06Q 30/06
USPC ........................................... 705/18
See application file for complete search history.

(56) References Cited

U.S. PATENT DOCUMENTS

| 6,873,970 | B2 | 3/2005 | Showghi |
| 8,175,913 | B2 | 5/2012 | Checketts |
| 8,447,067 | B2 | 5/2013 | Rhoads |
| 9,659,102 | B1 | 5/2017 | Cronin |
| 9,733,271 | B2 | 8/2017 | Hosein |

(Continued)

FOREIGN PATENT DOCUMENTS

| WO | WO-2016007961 A1 * | 1/2016 | ............. G06Q 10/02 |
| WO | 20170100865 A1 | 6/2017 | |

*Primary Examiner* — Russell S Glass
(74) *Attorney, Agent, or Firm* — Michael A. Bondi; Moss & Barnett

(57) ABSTRACT

A method of processing payments in a location-based sales venue such as a restaurant. Each customer location has a physical identity target attached in proximity thereto comprising a unique system-wide identifier readable by mobile customer devices. Targets might be visually readable, using QR codes or the like, or might be a short range radio beacon broadcasting the identifier (NFC, RFID etc.)—they do not contain human-readable location indication information. The identifiers associated with the targets do not contain location- or venue-specific information, and are recorded in relation to location records corresponding to individual customer locations in the venue in a location database held on a server. On reading of a target by a customer device and a related location transmission to the server, the server can associate the transmission with its related customer location in the venue-associated POS system, facilitate a payment transaction for the amount owing at the selected customer location through a transaction gateway, and provide a transaction completion indication to the POS system. The method allows for enhanced velocity in deployment and Maintenance of location targets, and enables mobile device-based payment in venues previously not offering same. Systems and software are also disclosed.

24 Claims, 6 Drawing Sheets

(56) References Cited

U.S. PATENT DOCUMENTS

| | | |
|---|---|---|
| 9,870,585 B2 | 1/2018 | Cronin |
| 2011/0093302 A1* | 4/2011 | Hernandez ............. G06Q 10/02 |
| | | 705/5 |
| 2014/0046802 A1* | 2/2014 | Hosein ................... G06Q 30/06 |
| | | 705/26.61 |
| 2015/0356664 A1 | 12/2015 | Mackler |
| 2016/0189287 A1 | 6/2016 | Van Meter |
| 2017/0357959 A1 | 12/2017 | Checketts |
| 2018/0047092 A1 | 2/2018 | Hennessy |

* cited by examiner

FACILITATING LOCATION-BASED SALES VENUE TRANSACTION PAYMENTS USING NON-LOCATION-BASED IDENTITY TARGETS

FIELD OF THE INVENTION

This invention is in the field of POS systems and methods for use in restaurants and other location-based sales venues, and more specifically deals with a method of facilitating customer payments using non-location-based identity targets related to customer locations within the venues.

BACKGROUND

Continued evolution and service development across many industries, including many service industries, requires the application of computer technologies to customer facing services to offer enhanced and customized services with optimized efficiency to the profitability of the business. One of the industries in which the development of electronic service offerings has lagged behind others is that of the hospitality industry—restaurants, bars and the like. Particularly in quicker service establishments where it is desired to provide an element of self-service and enhanced checkout speed, which will please customers and result in an increased turnout of table locations to potentially enhance profitability of the business, the ability to provide for self-service or enhanced velocity in payment transactions would be appreciated both by customers and the location-based sales venues in which they are dining or making other purchases.

The widespread availability of mobile customer devices, such as smart phones and the like, has enhanced further the proliferation of device facilitated business transactions. Virtually every customer has at least one smart phone or mobile device, and so payment methods which incorporate the use of those devices can be made widely available, and with the comfort level with those devices of users are generally speaking widely accepted.

Payment methods have been developed for use in restaurants and similar location-based sales venues which rely upon human data entry of a seating location into an app or a website available on a smart phone or similar user device. This typically involves either transposing the seating location within the restaurant which is printed on a label affixed near the chair in the establishment, or on the paper bill which is provided by the waitperson. However, the need for transposition of numerical seating locations or the like by data entry by the user on their user device can result in errors. If it were possible to provide a means of facilitating rapid self-service check out or payment in location-based sales venues such as restaurants, bars or the like, which did not rely upon human data entry to properly enter and select the bill to be paid within the establishment, it is felt that this would be preferred in industry and would be more widely accepted by users.

Other previous attempts have been made to streamline self checkout capabilities in restaurants and the like by placement of a machine-readable label at individual customer locations within the location-based sales venues. For example each table in a restaurant, or each seat at a table in a restaurant, has a label attached which can be scanned by a typical QR code scanner or the like on the smart phone of the user, and which machine-readable code includes an indication specifically of the seating location within the venues which can be directly matched back to the seating location in the restaurant POS system, to facilitate the payment of corresponding service charges. For example see U.S. Pat. No. 9,117,231 to Qikserve Ltd., entitled "Ordering System and Method for Restaurants".

Many previous attempts would have included the need for installation of significant quantities of specific software or hardware addons or upgrades to venue-associated POS systems to facilitate such self-service payment approaches. Specific network hubs or hardware systems to allow integration with site-based POS systems significantly increase the cost and complexity of such approaches and limit their market adoption rate. If it were possible to provide this type of a smart device-enabled self-service payment option for use in location-based sales venues using pre-existing network connections of site-based POS systems, or requiring only a limited modification to allow for wide area network connectivity with customer devices it is known that this would also enhance the marketability of such service offerings.

Systems such as the Qikserve system outlined above however are not rapidly scaleable or easily maintained insofar as they require the printing of customized labels for use at each seating or customer location within a location-based sales venue—for example, where each seat has a label attached corresponding thereto, following detailed layout planning of the venue labels need to be individually printed corresponding to each particular location, and if a label is ruined in installation or in prolonged use, individual customized labels need to be reprinted for attachment in their place. The need for custom label printing equipment either permanently onsite or on behalf of system vendors or maintenance, introduces an element of complexity in installation and maintenance which can limit the uptime or venue satisfaction and cost with the use of such systems. Spare labels can be kept in hand, but the need to print complete sets of spare labels result in a large inventory of spare labels with location-specific printing thereon some of which may never be needed and others of which may run out regularly. Alternate systems allowing for location-based payment facilitation in location-based sales venues using customer devices, which would limit or eliminate the complexities of location-specific labelling would in our view be preferential.

SUMMARY OF THE INVENTION

One aspect of the present disclosure relates to a method for use in the processing of payments for at least one location-based sales venue containing a plurality of customer locations and at least one network-connected venue-associated POS system. Each customer location has a physical identity target attached in proximity thereto comprising a unique system-wide identifier readable by mobile customer devices. A server includes a payment processing software component for carrying out the steps of the method, a network interface capable of two-way communication via at least one data network with mobile customer devices as well as with all of the venue-associated POS systems, a transaction gateway through which customer payments can be processed, and a location database. The system and method of the present invention is explicitly contemplated for use in deployments encompassing a plurality of sales venues.

The location database includes a venue record corresponding to each location-based sales venue and containing venue payment details via which payments to the venue can be electronically processed by the transaction gateway and network address details for each venue-associated POS system by which the server can communicate with same, and a location record corresponding to each physical customer location in each managed venue and containing the unique identifier of the associated physical identity target and identification of the venue-associated POS system affiliated with the customer location.

In a customer-initiated payment step, the server and the payment processing software component will facilitate a desired payment transaction by a customer seeking to pay the outstanding service bill in respect of at least one selected customer location. The customer would use their mobile device to read the physical identity target in respect of the selected customer locations in respect of which they wish to pay and a location transmission from the customer device to the server would be generated, including the identifiers of each selected customer location. Facilitating the desired payment transaction would comprise receiving at the server a location transmission containing the identifier of the physical identity target of the at least one selected customer location from a customer mobile device having read and captured the identifier. On receipt of a location transmission, the server will parse the location transmission to extract the received identifier of the physical identity target for each of the at least one selected customer locations contained therein.

The payment processing software component will select the location records corresponding to each selected customer location by matching the received identifiers with the details of associated identifiers stored within the location records. Following identification of the selected location records corresponding to the received identifiers, the server will query the venue-associated POS system for each selected customer location to obtain the required payment details and determine the total payment amount required from the customer.

The server will also obtain customer payment method details from the customer via their mobile customer device—this would likely take place following the calculation of the transaction total in a two-way communication between the server and software on the customer device. Once the customer payment method details were obtained, such as a credit card number or other payment type, the server could initiate a payment transaction via the transaction gateway in the amount of the total payment amount required, using the customer payment method details as the chargeable payment method, and using the venue payment details stored in the venue record related to the selected customer locations to properly route the payment. The routing of the payment might take place automatically and directly from the customer's payment method via the transaction gateway directly to a receiving account or directly to the venue using the venue payment details, or in other embodiments of the invention, the server and the service provider operating the server could aggregate recovered customer payment amounts and forward them periodically in an aggregated total, with appropriate reconciliation or background information, to the venue. All such approaches to the actual payment processing element of the method of the present invention are contemplated within the scope hereof.

Following the completion of the payment transaction by the transaction gateway, the server would transmit a payment completion indication in respect of the selected customer locations to each associated venue-associated POS system. Effectively, the POS system on site which is responsible for capturing and administering billing to customers would be notified by the server when a payment was completed, as well as other appropriate details of the payment received, such that that location could be cleared for reuse or otherwise updated in the POS system. The contents of the payment completion indication in respect of the transaction could include multiple additional information fields or tokens in addition to an indication of payment completion—for example if the customer added a gratuity to their payment etc. the details of that information could also be communicated back to the POS system associated with each selected customer location for further use in handling on-site.

As outlined above and elsewhere herein, it is explicitly contemplated that transaction payments could be initiated by a customer in accordance with the method of the present invention in respect of one or more selected customer locations within a location-based sales venue. For example, this might make it easy for individual customers at a table of multiple customers to split their bills by initiating a single payment transaction for the bill associated on the venue-associated POS system with each individual seat or customer location, or in other cases, where it was desired to pay the bill in respect of the entire table, the customer initiating the payment could use their mobile customer device to read the physical identity target of each of the seats at the table, such that for example in a table of six people in this scenario, the location transmission initiated from the mobile customer device to the server could include six identifiers [or in other cases six individual selected location transmissions could be originated]. All such modifications are understood to be within the scope of the present invention.

The physical identity targets themselves could be a visually readable label or electronic display, displaying an indicia such as a QR code or a barcode which related software on the mobile customer device could read. In the case of a electronic display device displaying a visually readable indicia for the identifier, the electronic display device could be updated as required if it was desired to use dynamic identifiers versus static identifiers.

A second type of physical identity target which could be used would be a short range radio beacon, such as a NFC or RFID beacon or tag, which would be readable by a reader contained within the mobile customer device. In such a case the physical identity target broadcasts the identifier associated with the customer location and is readable by radio rather than by vision or scanning with the camera or the like of the mobile customer device. Use of beacons, which are understood by those skilled in the art, would allow for concealed installation of the physical identity targets and might be desired in a more permanent or upscale installation where it was desired to not place a large number of targets in respect of customer locations on the tables or other services related to the customer locations within the venue.

The use of generic systemwide serial identifiers that are not customized or do not specifically correspond to the venue or the customer location within the venue represents a significant and patentable improvement over the current state-of-the-art insofar as the speed of deployment and maintenance of systems employing the method of the present invention without the need for custom printing or manufacture of the physical identity targets for each customer location will be understood by those skilled in the art.

It may also be the case in certain circumstances, again using the example of a restaurant, that a single physical identity target could be provided which would allow for practice of the method of the present invention in respect of multiple customer locations at one time—for example, a table in a restaurant might include a physical identity target in respect of each chair at the table, and there might be another target provided which had a separate identifier expressed thereon which was programmed on the back end to correspond to all of the seats at the table, so that if someone wished to generate a payment transaction in respect of all the seats at the table they could scan the one table target rather than scanning all of the seat targets at the table. The necessary modifications to the system of the present invention to allow for the inclusion of this additional layer of customization will be obvious to those skilled in the art and are contemplated within the scope hereof as well.

A key element of the method of the present invention is that the systemwide identifier displayed on each identity target in respect of a customer location would not include any venue or location specific information requiring custom printing. The identity target may or may not also include any human readable information whatsoever. Insofar as the systemwide identifier used in respect of each customer location and stored in the corresponding location record would not correspond directly to the venue or the location i.e. it would effectively comprises systemwide serial number, random token or the like, it is easy to replace a particular identity target as required without the need for significant custom printing or customization requirements. The identifier used on each physical identity target would be different systemwide i.e. it would not match the identifier used on any other identity target on any other customer location in any venue connected to the system.

As outlined in further detail throughout, the location-based sales venues of the present invention could be hospitality venues such as restaurants, bars or the like, or might comprise any other type of a location-based sales venue being any type of a business establishment in which customer charges were calculated or aggregated in respect of individual customer locations within the venue. All such venues and all such approaches are contemplated within the scope hereof.

Some location-based sales venues might include more than one POS system, with certain customer locations within the venue allocated to one POS system and others to another. It is expressly contemplated and encompassed by the claims outlined herein that the system could accommodate location-based sales venues including more than one venue-associated POS system, by having the necessary information for network communication between the server and any necessary venue-associated POS systems stored in the venue record of the location database, and storing also in the database likely in the location record corresponding to each customer location information related to the particular POS system to which a particular location is assigned.

As also outlined above it is explicitly contemplated the system and method of the present invention could be practiced in a large number of venues using a single server and backend system. The method of the present invention could either be used in one venue, with a single server, network connection and the like, or in a multiple venue scenario, multiple venues of even multiple proprietors could use the same system with the appropriate authentication and security and communication channels established between the venue-associated POS systems and the server. Again any necessary modifications to the system and method of the present invention to accommodate the use in one or more venues of one or more vendors will be understood to those skilled in the art and are all contemplated within the scope of the present invention.

The physical identity target at a customer location in a venue using the system of the present invention could be read by the mobile customer device using pre-existing software on the customer device, such as a scanner and browser combination, or a specific client app could also be developed and installed on mobile customer devices to facilitate participation in the method of the present invention. Both such approaches are contemplated within the scope of the present invention. Whether pre-existing software or and installed proprietary client app were used, the reading of the identifier from a physical identity target in respect of a customer location in a venue would result in the initiation of a location transmission to the server and a payment transaction.

In some implementations of the method, the server may be a web server. In some implementations of the method, the identifier contains a web link and the pre-existing software includes a reader capable of parsing the identifier to extract or look up the web link or other identifier matter. In some implementations of the method, the pre-existing software also may include a web browser which will open the parsed web link to initiate the location transmission and subsequent payment interaction between the customer and the server.

The server could include the transaction gateway software or hardware necessary to process payment transactions directly, or in other embodiments of the server in the method of the present invention, a transaction gateway might be integrated with the server that was externally located, via an appropriate network connection Another aspect of the present disclosure relates to a computing platform configured for use in the processing of payments for at least one location-based sales venue containing a plurality of customer locations and at least one network-connected venue-associated POS system, wherein each customer location has a physical identity target attached in proximity thereto comprising a unique system-wide identifier readable by mobile customer devices. The computing platform may include a non-transient computer-readable storage medium having executable instructions embodied thereon. The computing platform may include one or more hardware processors configured to execute the instructions. The processor(s) may execute the instructions to provide a server including a payment processing software component for carrying out the steps of the method, a network interface capable of two-way communication via at least one data network with mobile customer devices as well as with all of the venue-associated POS systems, a connection to a transaction gateway through which customer payments can be processed, and a location database including a venue record corresponding to each location-based sales venue and containing venue payment details via which payments to the venue can be electronically processed by a transaction gateway and network address details for each venue-associated POS system by which the server can communicate with same, and a location record corresponding to each physical customer location in each managed venue and containing the unique system-wide identifier of the associated physical identity target and identification of the venue-associated POS system affiliated with the customer location. The processor(s) may execute the instructions to, in a customer-initiated payment step using the server and the payment processing software component, facilitate a desired payment transaction by a customer seeking to pay the outstanding service bill in respect of at least one selected customer location. Facilitating the desired payment transaction may include receiving at the server a location transmission containing the identifier of the physical identity target of the at least one selected customer location from a customer mobile device having read and captured the identifier. Facilitating the desired payment transaction may include parsing the location transmission to extract the received identifier of the physical identity target for each of the at least one selected customer locations contained therein. Facilitating the desired payment transaction may include selecting the location records corresponding to each selected customer location by matching the received identifiers with the details of associated identifiers stored within the location records. Facilitating the desired payment transaction may include querying the venue-associated POS system for each selected customer location to obtain the required payment details and determining the total payment amount required from the customer. Facilitating the desired payment transaction may include receiving customer payment method details from the mobile customer device of the customer. Facilitating the desired payment transaction may include triggering a payment transaction for the total payment amount via the transaction gateway using the customer payment method details from the mobile customer device and the venue payment details from the venue record associated with the selected customer locations. Facilitating the desired payment transaction may include, on completion of the payment transaction, transmitting a payment completion indication in respect of the selected customer locations to each associated venue-associated POS syste. The system-wide identifier displayed on each identity target may do not include any identifying information related to the location-based sales venue or customer location and is not repeated between any two customer locations. Each physical identity target may contain no human-readable indication of the location-based sales venue or the customer location.

In addition to the method of the present invention in its various embodiments, there is also disclosed a server configured for use in the processing of payments for at least one location-based sales venue containing a plurality of customer locations and at least one network-connected venue-associated POS system, wherein each customer location has a physical identity target attached in proximity thereto comprising a unique system-wide identifier readable by mobile customer devices. The server comprises:
   a) a non-transient computer-readable storage medium having executable instructions, being a payment processing software component, embodied thereon;
   b) one or more hardware processors configured to execute the instructions;
   c) a network interface capable of two-way communication via at least one data network with mobile customer devices as well as with all of the venue-associated POS systems;
   d) a transaction gateway through which customer payments can be processed; and
   e) a location database comprising a venue record corresponding to each location-based sales venue and containing venue payment details via which payments to the venue can be electronically processed by a transaction gateway and network address details for each venue-associated POS system by which the server can communicate with same, and a location record corresponding to each physical customer location in each managed venue and containing the unique system-wide identifier of the associated physical identity target and identification of the venue-associated POS system affiliated with the customer location.

The server outlined and disclosed will permit the completion of customer payment transactions in respect of selected customer locations and location-based sales venues, in accordance with the method outlined above.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numerals, and where:

DETAILED DESCRIPTION OF ILLUSTRATED EMBODIMENTS

To fully appreciate the functionality of the present invention it is beneficial to establish certain terminology used in the remainder of the specification to describe the invention. The invention comprises a payment system for use in conjunction with location-based sales venues. A location-based sales venue is any kind of a sales establishment where products or services are sold in relation to multiple customer locations in the venue. For example in a restaurant, each table in the restaurant or in a more granular way each seat in the restaurant might constitute a separate customer location. While it is explicitly contemplated that the sales venues would include restaurants, bars and the like, this could also be used in any number of other venues which had specifically enumerated customer locations—sports venues etc. come to mind. Any type of a sales venue that has multiple customer locations in respect of which purchases of products or services might be posted to a POS system for payment is contemplated within the scope of the present invention.

As outlined above, a customer location comprises a specific billable location within a sales venue. For example in the restaurant at which the POS system captured purchases at the table level, each table might comprise a customer location. In other restaurants or sales venues where a more granular billing system was used down to individual seating or standing positions for service or purchase, individual seats might each comprise an individual customer location.

Within a location-based sales venue there would be at least one venue-associated POS system. The venue-associated POS system is the system in which purchases for individual customer locations are catalogued for subsequent payment, charging or purchase. There are numerous types of pre-existing venue-associated POS systems for use in hospitality establishments and other types of location-based sales venues in respect of which the method of the present invention could be employed so long as that pre-existing venue-associated POS system was capable of network communication with the server. Some sales venues might actually have more than one venue-associated POS system depending on size or complexity. In the case of a venue having more than one venue-associated POS system, each customer location within the venue would typically be assigned to a particular POS system for billing purposes.

Figure 1:
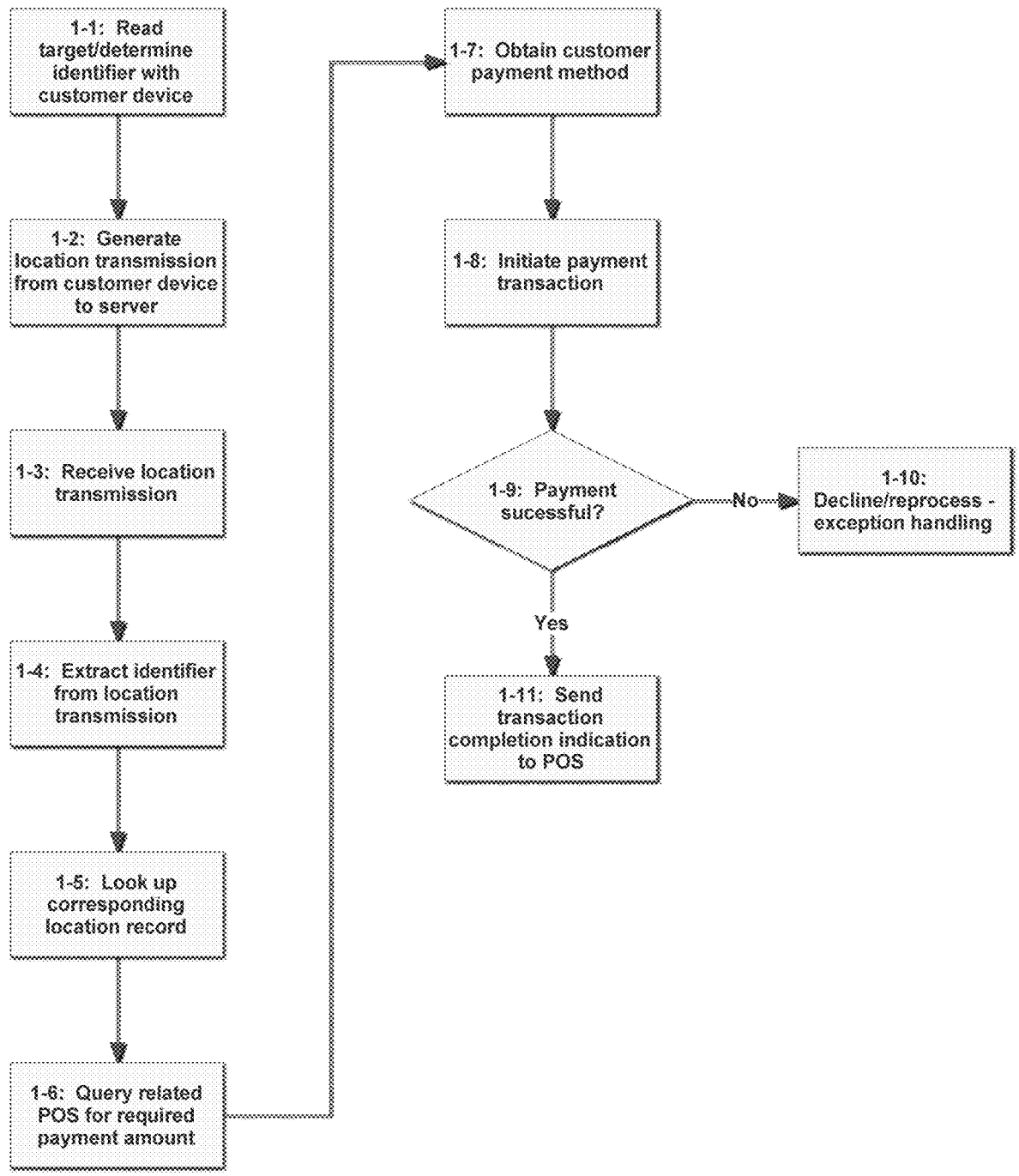
FIG. 1 is a flow chart showing the steps in one embodiment of the method of the present invention.

Method Overview:

Referring to FIG. 1 there is shown a flow chart outlining the steps involved in one embodiment of the method of the present invention, to assist a customer in processing a payment transaction with respect to a customer location within a location-based sales venue as outlined herein. Each customer location within the location-based sales venue would have a physical identity target attached in association therewith, which was readable by a mobile customer device to yield the reading of an identifier in relation to the customer location. The identifier as outlined elsewhere herein would be unique systemwide, and would not include any venue or location-based indication—the use of random or serial systemwide identifiers, which are equated to location records in the database on the backend, results in a more rapidly deployed and serviced system which is less reliant upon any kind of custom printing or custom configuration at the venue end to implement and operate, yielding a more palatable system for the customer. The fact that the physical identity target is machine-readable, versus requiring human intervention to manually transpose a serial code or the like into a computer program to allow for customer initiated self-service payment is another significant commercial benefit to the system and method of the present invention. In some implementations, the method of FIG. 1 may be accomplished with one or more additional operations not described, and/or without one or more of the operations discussed. Additionally, the order in which the operations of the method are illustrated in FIG. 1 and described below is not intended to be limiting.

The first two steps shown in this demonstrate the steps of the customer actually initiating the payment transaction by reading the physical identity target in respect of their desired customer location. Shown at 1-1, the customer will use their mobile customer device 2 to read the physical identity target of the method which is disposed at or in respect of the customer location in respect of which they wish to initiate a payment transaction—as outlined that would either be a scannable or visually readable label or the like capable of reading by a camera and a scanning app on the device, or in other cases might be a short range broadcasting radio beacon of some kind, including an RFID tag or an NFC beacon, which would broadcast the identifier corresponding to the seating location for use in the remainder of the method. Software on the device would extract or process the information read from the target, to yield the unique system identifier of the target, and would transmit that identifier to the server of the present invention within a location transmission, shown at 1-2. The receipt of a location transmission at the server, shown at 1-3, is the step which will initiate the processing of a payment transaction by the server in accordance with the remainder of the present invention.

The customer device 2 would include the necessary hardware and software to read a physical identity target, each target including a unique identifier which is not repeated systemwide, and which can be matched by a database lookup against a location database to correlate the target to the actual customer location in respect of which it is provided.

In some cases it is explicitly contemplated that the extractable or parseable identifier contained within a physical identity target would be a unique link which would be used by software on the customer device 22 initiate a communication with the server 1 in respect of the particular customer location—ie. a link such as https://pavserver.com/12erfQ435pz.htm [this link being a randomly generated example]—where there was software on the customer device 2 capable of opening a network or Internet link, such as a browser, a link such as this comprising the extractable identifier within a target could for example initiate a browser session by the customer device 2 with the server 1 of the present invention which might correspond to the "payserver.com" address, and the specific unique identifier of the customer location might comprise the text "12erQ435pz". A location record within the location database could then contain the necessary additional information to map the random text "12erQ435pz" to a particular seating location and a particular POS system within a venue. The benefit of the random and unique identifiers used in the targets of the present invention, that do not directly include any venue or customer location identifying information, is that if a new target need to be deployed for example because the label was destroyed, or a hardware radio target needed to be repaired or replaced, the only change that we need to be made for the system to continue operating would be to use a new random target and to update the field and the corresponding location record in the database to read as for example "72saWQ45py" instead of the older target identifier "12erQ435pz" and immediately any new database lookups coming back on that new identifier went correspond to the correct venue, POS system and location details. In other cases, the information contained within the target and comprising the identifier might take a different form. Both such approaches are contemplated within the scope hereof.

Once the target was read by a customer device and the identifier extracted in respect of a particular customer location in a serviced venue in respect of which it was desired to facilitate a transaction payment, the identifier could be used to initiate a transaction payment—by triggering a location transmission from a customer device 2 to the server 1. For example using the example above of the actual encoded identifier within the target comprising a network address or link, a browser or other software on the customer device opening that link, resulting in the opening of a communication session with the server 1 in respect of the particular identifier, could constitute the initiation of a location transmission. In other cases, purpose built client software in accordance with the remainder of the method of the present invention installed on the customer device 2 used to read the identifier from a physical identity target of a particular customer location within a venue could specifically open a transmission as well. Both such approaches are contemplated within the scope of the present invention. It is primarily contemplated that the use of an extractable identifier which included a network address such as the https-// payservr.com/12erQ435pz.htm example outlined above would be the most easily deployed in respect of the largest number of customer devices 2 and it is explicitly contemplated this type of approach where the identifier which could be extracted from a target was on web link or a network link which would be used to initiate a communication session with the server and by requesting a particular page, identify the particular unique systemwide identifier to be associated with the location would be completely understood and is contemplated as a primary embodiment of the methodology for the initiation of a location transmission to the server, including the necessary systemwide unique and or random identifier which did not specifically identify directly the venue or the location in respect of which it was transmitted is contemplated within the scope of the present invention.

Upon receipt of a location transmission by the server, in step 1-3, the server 1 in conjunction with the payment processing software 7 and other components therein will initiate a payment transaction. The first step in that transaction in accordance with the method will be the extraction of the identifier of the physical identity target corresponding to the selected customer location from the location transmission. This is shown at step 1-4. The specifics of the disassembly or parsing of a location transmission packet or packets to yield transmitted information over a computer network will be understood by those skilled in the art of software, hardware and communications design and any type of an approach resulting in the transmission of the identifier of the physical identity target of the customer location from the mobile customer device to the server, and the subsequent extraction of that identifier from the location transmission, are understood to be within the scope of the present invention. In an example where the location transmission was initiated by a browser or similar software on a customer device, the extraction or identification of the customer location from the location transmission could be as simple as extracting the identifying portion from the link which is used as the complete identifier within the target and which has been open the communication session—again relying quickly on the example of a location transmission comprising an open network transmission to open a communication session between the customer device 2 and server 1 based upon a network address or link reading as https://payservr.com/12erQ435pz.htm, the server could extraction the unique identifier "12erQ435pz" based on straightforward parsing of the link and the network call received from the customer device 2.

As outlined elsewhere herein, the identifier of the physical identity target would be a random or serially assigned systemwide unique identifier, which did not include any specific or direct identifying information of either the venue or the specific customer location in respect of which it was attached. Details of the identifiers assigned by the server and the system the present invention to individual customer locations within the sales venues in question would be stored in individual location records corresponding to the customer locations, in the location database. The use of generic or nonidentifying information as the systemwide unique identifier is key to the novelty of the method of the present invention insofar as it permits for the rapid deployment and maintenance of the system and method of the present invention in various venues without the need for custom printed or custom manufactured physical identity targets.

Once the received identifier was extracted from the location transmission, at step 1-4, the software would conduct a lookup on the location database to locate the corresponding location record 13 in the database 11 using the received identifier. This is shown at step 1-5. Specifics of conduct of a database lookup are dependent to a degree upon the data structure of the database but will again be understood in their design and direction by those skilled in the art of database and software design and any type of a specific software approach which resulted in the conduct of a query or lookup to identify the corresponding location record in the database based upon the received identifier is understood to be within the scope of the present invention.

The corresponding location record 13 which would be located in step 1-5 would include the necessary details to identify the venue-associated POS system 10, in communication with the server, responsible for tracking charges in respect of the selected customer location. The server of the software would query the venue-associated POS system 10 in question to obtain the details of the required payment amount in respect of the at least one selected customer location, to determine the total payment amount required for the customer to pay the bill in relation to the at least one customer location in question. The POS lookup of the required information is shown at step 1-6.

The server 1 would also obtain in respect of the customer from their mobile customer device 2 a customer payment method—credit card details or the like—shown at 1-7. In some embodiments of the system and method of the present invention, the mobile customer device may include a specific software app or client which would store the necessary customer payment method details and they could be encapsulated within the location transmission initially generated by the mobile customer device. Provision of customer payment method details at any appropriate point within the overarching method of the present invention is contemplated within the scope hereof. For example, where the eating of the sickle identity target location comprises reading, extracting and activating an Internet link such as the https://pavserver.com/12erQ435pz.htm example outlined above, in a browser session that could be opened in respect of that link the server 1 in communication with the customer device 2 could request payment method details such as credit card details or the like from the customer in a browser window and when that information was provided that can be transmitted back to the server 1 for use in the initiation of the payment transaction.

Many customer devices 2 including smart phones such as an Apple iPhone or the like include software-based payment capabilities where a software wallet is maintained within the device allowing customers to facilitate payment for any number of different types of commercial transactions. It is explicitly contemplated that the payment transaction initiated in respect of a particular location transmission accordance with the remainder of the method of the present invention could be facilitated by the server 1, with appropriate authentication or permissions, working in conjunction with the authenticated customer device 2 to facilitate an automated payment transaction in accordance with that story wallet—in the Apple iPhone example, opening the link back to the server 1 of the present invention could with the appropriate and necessary exchange of information between the server 1 and the smart phone 2 trigger an ApplePay transaction. The Apple example outlined is only one of a number of types of automated wallet transactions which could be used, since virtually every smart device manufacturer as well as others offer online or mobile electronic wallet services and any number of different types of electronic wallet services and payment facilitation methods can be conceived operate in communication in conjunction with the remainder of the software and method of the present invention to facilitate the fastest possible authorization and processing of payment in a service venue in respect of one or more customer locations. All such approaches are contemplated within the scope of the present invention.

With the customer payment method details, as well as the necessary network address or other processing details for the venue-associated POS system 10 or its operator to which payment is to be made, the server would then initiate a payment transaction through the associated transaction gateway 16. The payment transaction is shown at step 1-8. The specifics of the handling of electronic payment transactions of this nature are understood to those skilled in the art and any type of a transaction gateway 16 design our integration which allowed the server and its related software components to process payment transactions with information captured in accordance with the remainder of the method of the present invention are contemplated within the scope hereof.

Step 1-9 as shown in this figure is a decision block in which the software of the server 1 would determine whether or not successful payment had been received from the customer in respect of the transaction. If payment processing was not successful, the software in the method could be further developed to include an exception handling routine through which credit card declines etc. could be reprocessed or other workflows implemented. If the payment is determined to have been processed successfully, the server upon confirmation with the transaction gateway 16 of the success of the payment transaction would provide a transaction completion indication back to the related POS system 10. In some implementations, the payment completion indication transmitted to the venue-associated POS system 10 may include details of the total payment amount processed including discounts or gratuities, or other transaction or payment details which can be captured or facilitated by the system and method of the present invention which might need to be communicated back to the venue-associated POS system 10 suspected individual payment transactions to allow for complete reconciliation, bookkeeping and the like.

So long as the venue-associated POS systems 10 were capable of network communication with the server 1, no significant hardware would be required onsite within a venue to permit the practice of the method of the present invention. In some cases the only hardware or venue specific customization required would be a hardware or software adapter or modification to be installed to permit network communication of the venue-associated POS system 10 or systems with the server. Certain venue-associated POS systems 10 may communicate using different communication protocols, authentication methods or the like, and it will be understood that the server and the remainder of the method of the present invention could be modified or customized to permit communication with venue-associated POS systems of multiple types of communication protocols and all such types of communication and necessary modification to the communication components of the software on the server in accordance with the remainder of the present invention are contemplated within the scope hereof.

Figure 3:
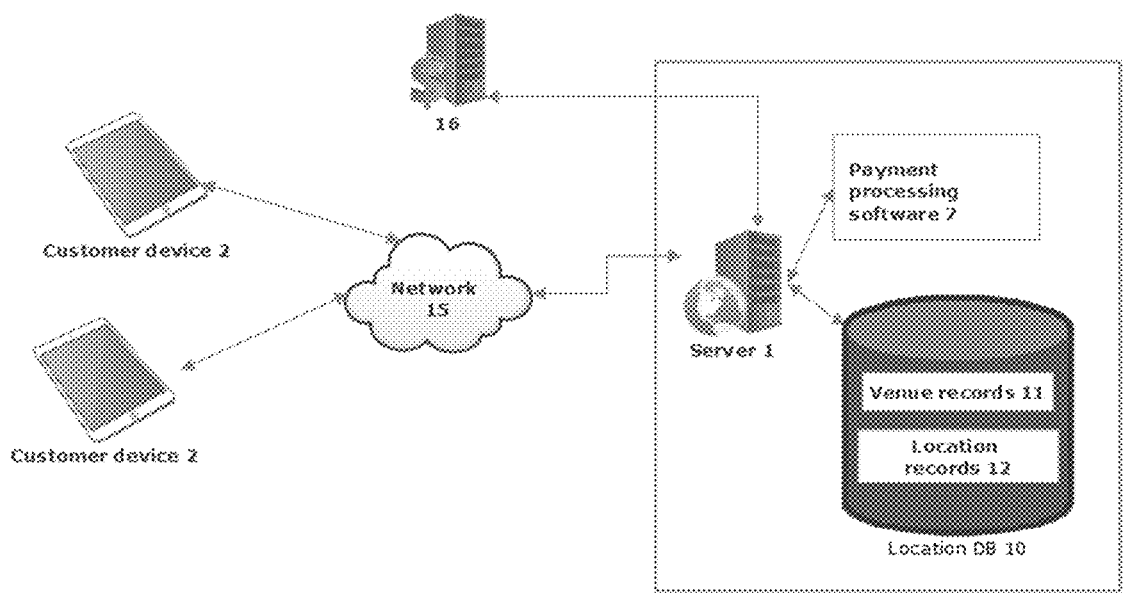
FIG. 3 is a schematic of a sample embodiment of a system in accordance with the present invention which could be used to achieve the method outlined.
Figure 4:
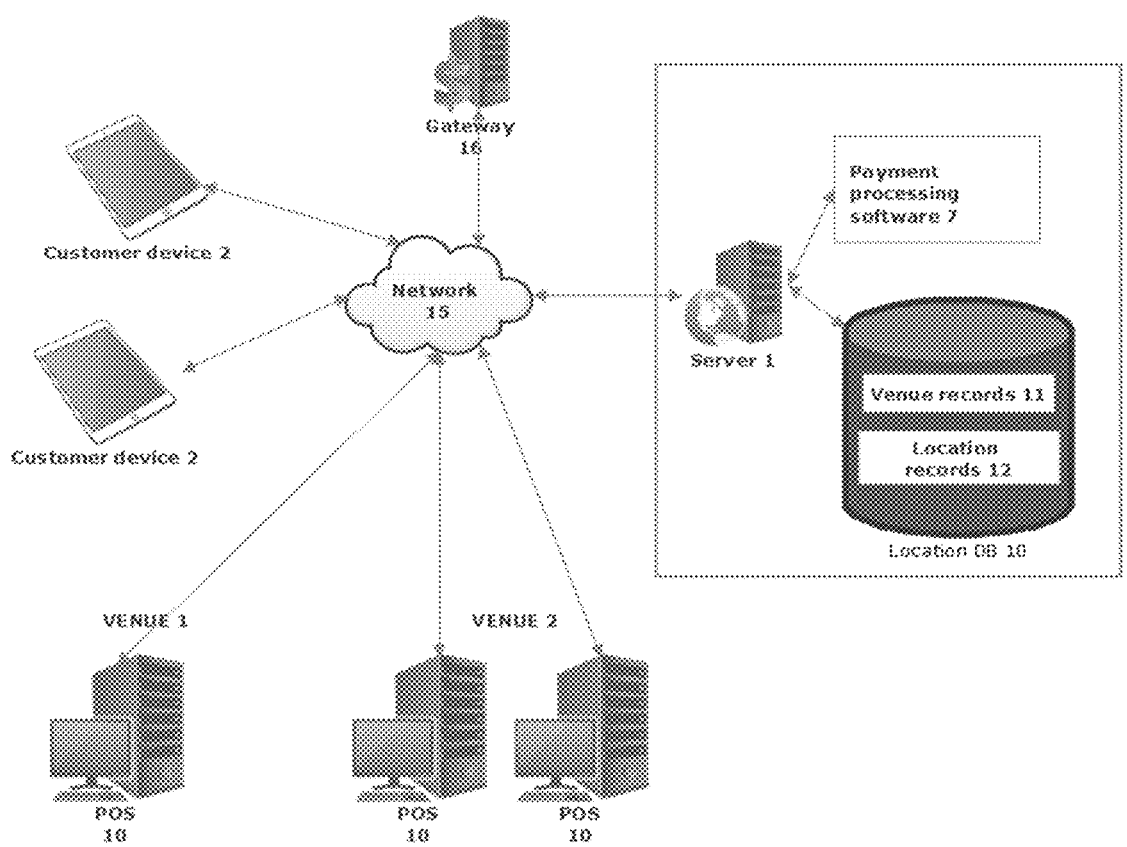
FIG. 4 is a schematic of an alternate embodiment of a system in accordance with the present invention, showing multiple sales venues.

FIGS. 3 and 4 are block diagrams of two potential basic system architectures of the present invention intended to demonstrate some of the types of architectures which are contemplated in conceptual embodiments of the method of the present invention. Referring first to FIG. 3 there is shown a diagram of a first potential basic system architecture of an overall number of components used for the practice of the system and method of the present invention.

Server 1 is shown, with payment processing software 7 in the data store 8 which contains the database 11 and other related information therein. Server 1 is shown to be operatively connected via a network interface to a network 15, which also permits the server 1 communicate with the other relevant portions of the client system for the purposes of transaction of the method of the present invention, including communication with a transaction gateway 16, a venue associated POS system 10, and a plurality of customer devices 2.

The system architecture shown FIG. 3 pertains to a single venue having a single venue associated POS system 10.

A transaction gateway 16 is shown, in network communication with the server 1 of which could be used to actually facilitate the processing of payments to various credit cards or other payment methods in accordance with the method of the present invention. It will be understood that in some embodiments, a plurality of transaction gateways 16 might also be used depended upon the payment method type and that both such approaches are contemplated herein.

The physical identity targets in the venue are not shown in this Figure but the physical identity targets corresponding to each of the customer locations within the venue will be understood from the remainder of this document.

FIG. 4 shows an alternate system block diagram, similar to that of FIG. 3 except that two venues are shown, one of which venues as a single venue associated POS system 10 and the other of which shows to venue associated POS systems 10. These two system architecture diagrams are simply provided to give a basic overview of the type of components and system architectures contemplated in the practice of the method of the present invention. It is contemplated that one of the commercial benefits of the system of the present invention is that the provider of the payment processing method of the system of the present invention would really only need to operate server 1 and its associated software components, and to provide to venues the physical identity targets for use in proximity to the various customer locations therein. It is explicitly contemplated that the POS systems 10 within the venues would already exist and could simply be communicated with via the network 15, or by the installation of a modest network bridge hardware or the like, and even the transaction gateway 16 would likely be pre-existing or could be programmed or connected by software and hardware directly to the server 1. The rapid backward compatibility of the system and method of the present invention in a particular location-based sales venue is one of the key aspects of the salability of the method and system outlined.

Identity Targets:

As outlined in further detail elsewhere herein, each customer location within a location-based sales venue operating in accordance with the method of the present invention would have a physical identity target attached in proximity thereto. This would either be a label or even a electronic video display capable of displaying a QR code, barcode or some other machine-readable indicia corresponding to an identifier of the customer location which could be scanned or read visually by a mobile customer device using a camera and related software application, or in other embodiments the physical identity target could be a short-range radio beacon, NFC or RFID tag or the like capable of broadcasting or communication with a radio receiver in the mobile customer device and capable of transmitting data which could be processed or have data corresponding to an identifier of the customer location extracted therefrom when read by a reader or receiver on a mobile customer device. Other physical identity targets could provide more than one means of acquisition of the unique identifier of the target i.e. they might include a barcode or QR code for scanning, along with the radio beacon of some kind, to maximize the number type of client devices 2 which would be capable of reading target. All such approaches are contemplated within the scope of the present invention.

Figure 2:
FIG. 2 is a sample of a printed label which could be used as a physical identity target in accordance with the present invention.

FIG. 2 shows a sample of a printed label which might be used as a physical identity target attached in proximity to a particular customer location in a sales venue. The label 1 includes a QR code 2 which comprises the necessary information to initiate a location transmission in respect of the particular assigned customer location. The QR code 2 or similar information to be read from a target may also include a web link, or other network or server address, which could be used by software on the mobile customer device to address the location transmission to the appropriate server.

As outlined throughout this document, the physical identity target might comprise a fixed static label which could be visually scanned using the camera of a mobile customer device 2 or a similar approach to initiate a location transmission in relation to the remainder of the method of the present invention, or in other cases, the physical identity target is explicitly contemplated to comprise a low-power radio beacon or the like—for example NFC or RFID readable tags, beacons or the like, a Bluetooth device or something similar in the case of a hardware readable or broadcasting target device being used, any type of a device which could be encoded with a unique systemwide identifier in accordance with the remainder of the method of the present invention, either statically or dynamically wearing it could be updated or changed as were fired were desired, are all contemplated within the scope of the present invention.

In the case of a visual display or network communicating radio beacons or the like, dynamic identifiers could even be used, whereby the identifier could be changed from time to time if required. Either statically printed or configured physical identity targets, or identity target hardware permitting the use of dynamic identifiers are both contemplated within the scope of the present invention.

Any type of an identity target which can be used in conjunction with the remainder of the method of the present invention is contemplated herein. It is also contemplated that in some embodiments of the method of the present invention, more than one type of identity target could be used in a single venue installation—for example certain customer locations might require the use of a printed tag with a barcode or the like, where other locations in the same venue might use beacons, RFID tags or the like. Again a blending of identity target technology within a particular sales venue is contemplated within the scope hereof.

Identifiers:

The actual identifier of a particular customer location within a sales venue encoded within the physical identity target is contemplated to be either a random or serial systemwide unique identifier. The identifier would not include any specific information that identified either the venue or the customer location—it would simply be a generic identifier which could be used in a lookup in a database on the server to identify a corresponding location record in the location database. The use of identifiers which do not include any specific information identifying the venue or the customer location is a specific patentable element of the system and method of the present invention—this will permit the use of generically printed or generically configured labels, beacons or other hardware in the installation of the system the present invention in a particular location-based sales venue, without the need for custom printing. This will significantly enhance the speed of installation as well as making maintenance way cheaper and quicker since custom printing of individual replacement labels or custom configuration of individual replacement beacon or target hardware will not be required. Use of generic nonidentifying targets and identifiers would permit the use of a basic software application to allow for on-site configuration and maintenance of the system in and after installation.

It is contemplated that the physical identity targets, insofar as they display the identifiers for acquisition by mobile customer devices in respect of particular customer locations, would not even need to include any human readable indicia in respect of the identifier, since it is explicitly contemplated that the system and method of the present invention would only be practice based upon machine reading of the identity target.

Venue-Associated POS Systems:

It is specifically contemplated that the method of the present invention can be practiced in conjunction with pre-existing venue-associated POS systems 10 in various location-based sales venues. For example if the sales venues are hospitality establishments—restaurants and bars or the like—pre-existing POS systems exist which allow for the charging and tracking of charges against individual customer locations within the venue. Many of these venue-associated POS systems 10 already permit for an Internet or network interface to allow for credit card processing or the like, so adaptation of the network interface on the venue-associated POS system 10 to permit exchange of information between the venue-associated POS system 10 and the server of the present invention could be achieved in many cases with simple software modification or opening of a communication channel between these devices. In other systems, a modest hardware interface might need to be installed on site to permit communication between older pre-existing POS systems without the same network communication capabilities, and the server.

Certain venue-associated POS systems are already operatively connected to a centrally based vendor cloud or vendor database or collection system which might also permit a simple API lookup or API communication between the server of the present invention and the pre-existing network backend of the venue-associated POS systems. Any type of a communication conduit which can be created between the vendor-based POS systems within a particular location-based sales venue and the server of the present invention will all be understood to be contemplated within the scope of the present invention.

As outlined in further detail elsewhere herein, some sales venues may have more than one POS system 10 located therein, with each POS system 10 responsible for charging or tracking in respect of a certain subset of the customer locations in the venue. Modifications can be made to the database and the location records tracked in respect of individual customer locations to permit proper communication or queries in lookups in respect of an individual customer location within the venue and processing of payment transactions in respect thereof.

Figure 5:
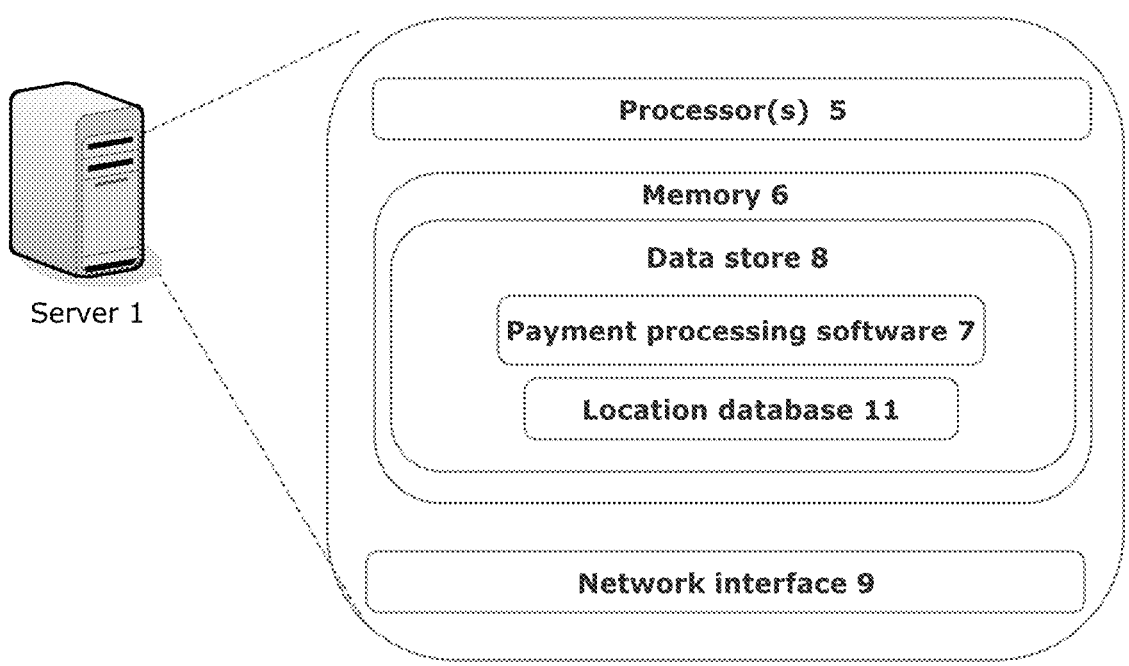
FIG. 5 is a block diagram showing the components of a server in accordance with the present invention.

Server Architecture:

The method of the present invention and the overall architecture would be client/server in nature and would rely on a server 1 configured for use in the processing of payments for at least one location-based sales venue containing a plurality of customer locations and at least one network-connected venue-associated POS system 10, wherein each customer location has a physical identity target attached in proximity thereto comprising a unique systemwide identifier readable by mobile customer devices, in accordance with one or more implementations. The server 1, a sample embodiment of which is shown in FIG. 5, might consist of one or more servers 1—a single server or a server farm approach. The server 1 would comprise one or more processors 5 and memory 6. The memory 6 might contain various software components or a series of processor instructions for use in the method of the present invention or otherwise in the operation of the server 1. Processor instructions corresponding to the payment processing software component are shown stored within the memory 6 in this Figure.

Server(s) 1 may be configured by machine-readable instructions, which may include one or more instruction modules. The instruction modules may include one or more of server firmware or operating systems, the payment processing software 7, and/or other instruction modules.

Memory 6 may comprise non-transitory storage media that electronically stores information. The electronic storage media of memory 6 may include one or both of system storage that is provided integrally (i.e., substantially non-removable) with server(s) 1 and/or removable storage that is removably connectable to server(s) 1 via, for example, a port (e.g., a USB port, a firewire port, etc.) or a drive (e.g., a disc drive, etc.). Memory 6 may include one or more of optically readable storage media (e.g., optical discs, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 6 may include one or more virtual storage resources (e.g., cloud storage, a virtual private network, and/or other virtual storage resources). Memory 6 may store software algorithms, information determined by processor(s) 5, information received from server(s) 1, information received from client devices 2, and/or other information that enables server(s) 1 to function as described herein.

Processor(s) 5 may be configured to provide information processing capabilities in server(s) 1. As such, processor(s) 5 may include one or more of a digital processor, an analogue processor, a digital circuit designed to process information, an analogue circuit designed to process information, a state machine, and/or other mechanisms for electronically processing information. Although processor(s) 5 is shown in FIG. 5 as a single entity, this is for illustrative purposes only. In some implementations, processor(s) 5 may include a plurality of processing units. These processing units may be physically located within the same device, or processor(s) 5 may represent processing functionality of a plurality of devices operating in coordination.

In many embodiments, the server 1 is contemplated to be a Web server, where client devices 2 would use a web browser for interaction therewith. Where a local app was developed, server 1 might not be a Web server per se but might be a server 1 capable of interaction with the type of an interface on remote client devices. Either such approach is contemplated within the scope hereof.

Server 1 would host or be operatively connected to the data store 8. In addition to the necessary general operating system instructions and the like, the server 1 would comprise a payment processing software component 7 which would be responsible for execution of the method of the present invention at the server and coordinating the communication with customer devices 2 of customers. The payment processing software component 7 might itself act as the interface between the remainder of the hardware and software of the server 1 and the data store, or the server 1 might alternatively include additional software interfaces to the data store 8.

The payment processing software component 7 would comprise subroutines for the purpose of administering the data store, creating, modifying and processing payment transactions and records in the data store, as well as additional financial or numerical transactions, searches or reporting as might be required. The details of the operation of the payment processing software component 7 are outlined elsewhere herein.

Server 1 also requires integration or connection of a transaction gateway 16, to facilitate the remainder of the method. Some embodiments of the method of the present invention might comprise the incorporation of the necessary additional hardware and software components within server 1 and its associated hardware and software to allow the server 1 itself to act as a transaction gateway to process payment transactions directly in respect of method transactions being executed in accordance with the remainder of the method, to the payment methods or credit cards and the like of customers, and crediting the amounts recovered back to the vendors. Where in certain cases the transaction gateway software and hardware would be operated as a component of the server 1, in other cases, the server 1 might be connected via its at least one network interface to externally provided transaction gateways in both such approaches are contemplated within the scope of the present invention. The design of a transaction gateway and communication between the transaction gateway 16 in the server 1 of the present invention will be understood to those skilled in the art of the development of POS and e-commerce systems and all such approaches are contemplated within the scope of the present invention.

Server 1 would also include at least one network interface 9 via which one could communicate with the at least one communications network for the purpose of enabling communication with the venue-associated POS systems on the customer devices of the remainder of the method as outlined herein. It will be understood by those skilled in the art of network design and hardware and software design that certain server architectures might include more than one network interface 9 and any type of a server 1 and network interface 9 design which enabled the communication of the server 1 the at least one data network outlined in the remainder of the method would all be contemplated within the scope of the present invention.

Database Design:

In the architecture shown, there is shown a data store 8 operatively connected to the remainder of the server 1 which contains the various required data for the operation of the method of the present invention. Any type of a data structure capable of storing the various information for the required data subsets in respect of venues, locations and purchase transactions are contemplated herein. The data store 8 might be resident on the server 1, or might be located and administered remotely and operatively connected with the server 1 via a network or other communications bus.

The one effective data structure required to facilitate the practice of the method of the present invention, in operable connection to the server 1, is a location database 11. The location database would include the necessary information for the practice of the method of the present, including a venue record 12 corresponding to each location-based sales venue. The venue record 12 for a venue would include the necessary venue payment details which would be used to process payments to that particular vendor or its operator on the one or more transaction gateways integrated or operatively connected to the server 1. The venue record 12 for a particular venue would also include any necessary network address details or other communication requirements to allow for the communication of the server 1 with each venue-associated POS system 10. Different venues may include different types of POS systems 10 some of which communicate using different communication protocols, where different security credentials of the like, and all of the necessary information to identify and allow the server 1 and the associated payment processing software component 7 to configure itself to communicate with those POS systems 10 or with respect to transactions with transaction gateways in that regard is all contemplated to be within the scope of the necessary information which could be designed into the data structure of the venue record 12.

It is explicitly contemplated that the system in the method of the present invention could be delivered as a service bureau type of a product, whereby the provider of the service and infrastructure of the present method could provide service to multiple venues in multiple customers and operators of venues. It is as such explicitly contemplated that embodiments of the method and the database of the present invention would explicitly incorporate any necessary security and other configuration to allow for compartmentalized operation and transaction processing by the system and method of the present invention on behalf of multiple customers of multiple vendors and multiple venue operators—the incorporation of such a security model to the database and software of the present invention will be understood to those skilled in the art and is explicitly contemplated within the scope hereof as well.

The location database 11 would also include a location record 13 in respect of each physical customer location in each managed venue. The location record 13 would contain the necessary information to match the physical identity target located in proximity to, or in respect of, the particular customer location within the venue—for example in a hospitality venue this could be a particular seat or table or the like—to a particular "charging location" within a venue-associated POS system 10. For example, a venue-associated POS system 10 in a hospitality establishment would contain the necessary software and records to allow for food and beverage orders and the like to be placed in the system 10 in respect of individual seating or table locations within the establishment, which individual seating or table locations would comprise individual customer locations in the context and lexicon of the present invention. Use of the location records 13 to match the generic and non-location identifying identifiers in respect of each physical identity target used in one or more venues, with the key or identifying information to properly identify each physical customer location in the associated venue-associated POS system 10, thus removing the need to use location identifying information within the identifier encoded within the physical identity target in respect of each customer location is the key aspect of the present method. Design of an appropriate record structure in the database 11 to record the necessary look up information to match the targets with the locations will be understood to those skilled in the art of software and database design and any type of an approach that achieves the subjective of providing location records 13 within the database 11 which would allow for lookup and matching of the customer locations within a venue to the physical identity targets and their encoded identifiers used are contemplated within the scope of the present invention.

There may be additional information encoded within the location records 13 for individual customer locations with the venue as well where for example more than one venue-associated POS system 10 is used in a particular venue—it may be necessary to provide or save in respect of each location record 13 necessary additional database keys or information to properly match or correspond lookups are charging in respect of a particular customer location within the venue with the proper affiliated POS system 10.

It is contemplated that the software of the server 1 may include a module or an interface permitting the installer of a system in accordance with the method of the present invention, or the vendor/operator of a venue, to quickly create or maintain the lookup location records 13 and to adjust or create the necessary records to match up individual deployed physical identity targets with locations within the menu. Providing a quick interface for this will allow for the quick deployment and replacement of physical identity targets where replacement or repairs required, or new locations are categorized or required to be added to the system. Provision of a software interface permitting an administrative user to administer the location records 13, or even the venue records 12 within the database, will be understood to those skilled in the art of database design as well and will also be understood to be contemplated within the scope of the present invention.

Figure 6:
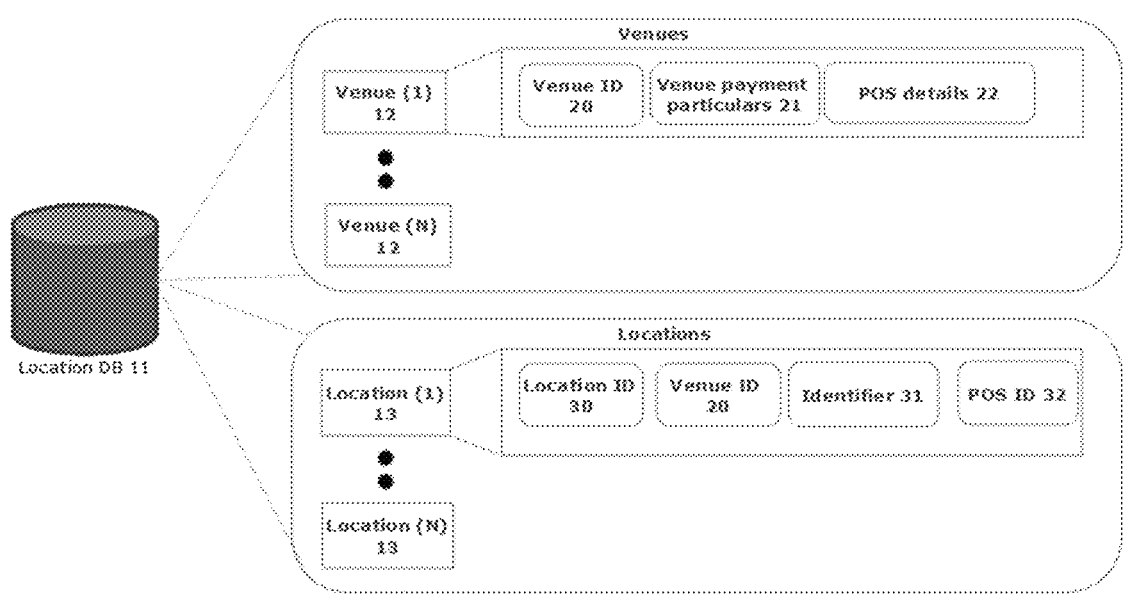
FIG. 6 is a sample schematic drawing of one data structure for the location database in accordance with some embodiments of the present invention, demonstrating the key components of the anticipated record structure.

FIG. 6 shows a sample data structure of the location database 11 in accordance with one embodiment of the present invention, simply to demonstrate type of data structure elements which are contemplated to be used in many embodiments of the method outlined a plurality of venue records 12 and a plurality of location records 13 are shown. As outlined above, a venue record 12 would exist in the database 11 in respect of each venue 10 in respect of which the method was to be administered. In respect of the venue records 12 that are shown, there is shown a record key being a venue identifier 20, which from the database and record identifying perspective would be understood to those skilled in the art of database design. In addition to the venue ID 20 there is also shown payment particulars 21 which would be stored in the venue record 12. The payment particulars 21 would comprise the necessary information to be used to process payments for transactions within the venue and appropriately route the recovered payment amounts and funds to the operator or vendor of that venue. Also shown are POS system details 22. The POS detail 22 would be any necessary information required for the server 1 to communicate with each venue associated POS system 10 within the venue. This might comprise network addresses, security or authentication credentials or the like. Again the rough structure of this record and database is shown in this Figure simply to demonstrate the nature of a basic record structure contemplated and it will be understood that any number of other architectural approaches could be taken to a location database 11 and the type of information required to administer the method of the present invention without departing from the desired scope and intention thereof.

Also shown are a plurality of location records 13. A location record 13 would be created for each customer location within each venue, such that the location record 13 would correspond to a physical identity target attached in proximity to a customer location such as, in the example of a hospitality installation at particular seat or table in respect of which POS billing might be desired to be tracked and subsequently paid in accordance with the method of the present invention. As outlined herein, the architecture of the location records 13 could also accommodate the ability for a location transmission from a customer device 2 the seat to initiate a transaction payment in respect of multiple customer locations in a venue at the same time. All such approaches are contemplated within the scope of the present invention.

In respect of the location records 13 shown, there are a plurality of location records 13 corresponding to the total number of billing locations within the total number of venues administered in accordance with the system. Obviously different architectural approaches could be taken to the completion or delivery of this type of a structure. As shown, there is a record key or a location ID 30 which will be understood to those skilled in the art. Each location record 13 would in some fashion in the data structure of the database 11 be cross-referenced to its appropriate location record 11, as is shown by the presence of the corresponding venue ID 20 in each location record 13 as shown. The other key information to be tracked within each location record 13 would be the unique non-location identifying identifier which has been associated with that particular customer location within the venue—the identifier is shown at 31. The identifier 31 is the information used to initiate a payment transaction in accordance with the remainder of the present invention by extraction of the identifier 31 from the scandal or reading of the physical identity target in respect of the particular location by a customer device 2.

Also shown is a POS ID 32. The POS ID 32 would be any necessary information required to relate the particular physical customer location within the venue, in respect of which the location record corresponds, to a particular POS system and POS location within the venue. The POS ID 32 would be any necessary address or link information which could be used in communication with the associated POS system to identify the corresponding customer location as was tracked within the POS system—for example each customer location within a venue containing one or more POS systems would already have some type of an identifier be that a table number, seat number or the like which has been assigned in respect of the location and is used for the purpose of tracking and generating POS billing. The POS ID 32 which would be stored within the location record 13 would be any necessary information to cross-reference the POS bill in association of the location on the appropriate venue associated POS system to the physical identity target identified in the record 13. For example in a venue having more than one venue associated POS system 10, it would potentially be necessary to identify which POS system was responsible for tracking and billing in respect of the particular customer location. As well, that POS ID 32 might actually include the seat number or other type of a system address used by the venue associated POS system in question to identify the particular billing record within that related POS system from which the billing amount related to the particular customer location can be identified for billing and payment purposes. The POS ID 32 might represent any necessary information which could be used to communicate with an appropriate venue associated POS system 10 the purpose of identifying the amount of a payment transaction required to clear the POS billing in respect of that particular customer location in the venue.

Additional information related to the location subject of the location record 13 could also be stored. This might include other field information for display on reports or other information which might be required for the purposes of the method of the present invention or other POS for tracking purposes.

The particular construction or data structure of the data store and individual data stored therein might also depend on the infrastructure design of the remainder of the system of the present invention. Again, the various aspects of the system, its structure and database design will be understood to those skilled in the art of relational database and client/server system design and are all contemplated within the scope of the present invention.

Communications Network:

It is specifically contemplated that the communications network which would be used for communication between the server 1 and the mobile customer devices 2 of customers would be the Internet or another publicly available wide area network. The removal of a requirement for a proprietary or closed communications network between remote venue-associated POS systems 10, mobile customer devices 2 and the server 1 facilitating the method represents one significant enhancement and cost efficiency of the method of the present invention. The specific protocol of communication between the various devices could vary, and differing communication protocols could be used between different devices in the system—all such approaches and architectures will be understood to those skilled in the art of wide area computer network design and all such approaches are contemplated within the scope of the present invention. In certain embodiments of the system and method of the present invention more than one communications network might be used.

The server 1, customer or client devices 2, as well as any venue-associated POS systems 10 would need to each comprise a network interface capable of communicating with the at least one communications network contemplated within the scope of the remainder of the present invention. It is explicitly contemplated that the wide availability of Internet connectivity would result in the best, simplest and most cost-effective network communications infrastructure to effectively implement the method of the present invention, although it will be understood that private networks could also be used albeit with the added cost and complexity in terms of client software for communication purposes. Both such approaches are contemplated within the scope of the present invention. Also contemplated is a scenario in which more than one communications network was used i.e. one communications network and a first network interface on the server 1 might occasionally customer devices 2, and a separate interface and or network might be used to facilitate communication between the server 1 of the present invention and the venue-associated POS systems 10.

Customer Devices:

The method of the present invention explicitly contemplates the use of network enabled mobile customer devices 2 by customers to initiate purchase transactions in accordance with the remainder of the method. It will be understood by those skilled in the art of client/server application design and the like that any type of a device which could communicate with the server 1 via a network and the related network interface would be within the scope of the present invention. Smart phones, PCs and other remote and network capable computing devices are all devices which will be understood to be contemplated within the scope of the present invention, insofar as they would each include a network interface by which the customer device 2 could communicate via a data network with the server 1. The majority of these types of commercially available hardware devices would already include all the necessary hardware and software components to participate in the method of the present invention. It will be understood by those skilled in the art of client/server remote application deployment that any type of a computing device capable of interaction with the server 1 and any other remainder of the system of the present invention and to interact with the server 1 of the remainder of its components by the network are contemplated within the scope of the present invention.

It is contemplated that the ideal customer device 2 would be a smart phone with a camera, since a smart phone with a camera and associated software would be capable of reading QR codes and other similar types of physical identity targets for use in accordance with the present invention. Many smart phones also include Bluetooth, RFID or NFC readers all of which could be used to read other types of physical identity targets.

The customer device could include pre-existing software, such as scan reading software and a browser for example, which could be used to facilitate the method of the present invention, or in other cases, specific purpose built client software could be used. Architecturally and conceptually, the concept of "apps" used on smart phones and other personal devices as a front end to centrally hosted systems is widely known. Where an interface is provided on the customer device 2, the user of the customer device 2 could interact with the system and the server 1 of the present invention by sending and receiving information between the interface of the customer device 2 and the server using Internet communication protocols or the like between the customer device 2 and the server 1. The specifics of implementing the client/server software system using a website or at a central bureau and an interface on the customer device will be easily understood by those skilled in the art of client/server software design and the method of implementation of such a similar approach is contemplated within the scope of the present invention.

Conceptually the use of a local app as the front end or interface to the server of the present invention, is at least as likely as the possibility of using a browser to facilitate the use of the method of the present invention. Development of either a browser interface or a local app interface as the user interface between the customer at the customer device 2 and the server 1, and the remainder of the centrally located method and architecture of the present invention, will be understood to those skilled in the art of client/server database and application design and all such approaches are contemplated within the scope of the present invention.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

In addition, it will be apparent to those of skill in the art that by routine modification the present invention can be optimized for use in a wide range of conditions and application. It will also be obvious to those of skill in the art that there are various ways and designs with which to produce the apparatus and methods of the present invention. The illustrated embodiments are therefore not intended to limit the scope of the invention, but to provide examples of the apparatus and method to enable those of skill in the art to appreciate the inventive concept.

The invention claimed is:

1. A method of processing payments for at least one location-based sales venue containing a plurality of customer locations and at least one network-connected venue-associated POS system, wherein each customer location has a physical identity target attached in proximity thereto comprising a unique identifier readable by mobile customer devices, the method comprising:
   a) providing a server including a payment processing software component, a network interface capable of two-way communication via at least one data network with mobile customer devices as well as with all of the venue-associated POS systems, a transaction gateway through which customer payments can be processed, and a location database comprising a venue record corresponding to each location-based sales venue and containing venue payment details via which payments to the venue can be electronically processed by the transaction gateway and network address details for each venue-associated POS system by which the server can communicate with same, and a location record corresponding to each physical customer location in each managed venue and containing the unique identifier of the associated physical identity target and identification of a venue-associated POS system affiliated with the customer location;
   b) in a customer-initiated payment step using the server and the payment processing software component, facilitating a desired payment transaction by a customer seeking to pay the outstanding service bill in respect of at least one selected customer location by:
      i) receiving at the server a location transmission containing the identifier of the physical identity target of the at least one selected customer location from a customer mobile device having read and captured the identifier;
      ii) parsing the location transmission to extract the received identifier of the physical identity target for each of the at least one selected customer locations contained therein;
      iii) selecting the location records corresponding to each selected customer location by matching the received identifiers with the details of associated identifiers stored within the location records;
      iv) querying the venue-associated POS system for each selected customer location to obtain the required payment details and determining the total payment amount required from the customer;
      v) receiving customer payment method details from the mobile customer device of the customer;
      vi) triggering a payment transaction for the total payment amount via the transaction gateway using the customer payment method details from the mobile customer device and the venue payment details from the venue record associated with the selected customer locations; and
      vii) on completion of the payment transaction, transmitting a payment completion indication in respect of the selected customer locations to each associated venue-associated POS system;
   wherein the unique identifier displayed on each identity target is not duplicated on any two location records; and
   wherein each physical identity target contains no human- or device-readable indication of the associated sales venue or customer location.

2. The method of claim 1, wherein at least one location-based sales venue is a food-location-based sales venue.

3. The method of claim 1, wherein the payment completion indication transmitted to the venue-associated POS system includes details of the total payment amount processed including discounts or gratuities.

4. The method of claim 1, wherein the number of venue-associated POS systems at a venue is one.

5. The method of claim 1, wherein the number of venue-associated POS systems at a venue is more than one and the location records corresponding to the managed venue do not all use the same venue-associated POS system.

6. The method of claim 1, wherein the number of venues is one.

7. The method of claim 1, wherein the number of venues is more than one.

8. The method of claim 1, wherein the identity targets used are selected from the group of printed QR codes or printed bar codes.

9. The method of claim 1, wherein the identity targets comprise e-paper devices or other electronic displays having the ability to visually display identifiers readable by customer mobile devices, short-range radio beacons, RFID tags or NFC tags.

10. The method of claim 9, wherein the identifiers are dynamically adjustable and the display or broadcast of the identifier by the device in proximity to the customer locations can be changed when the identifier is changed.

11. The method of claim 1, wherein the identifier of a physical identity target will be read by pre-existing software on the customer mobile device, and the reading of the identifier will result in the initiation of a location transmission to the server.

12. The method of claim 11, wherein the server is a web server, the identifier contains a web link and the pre-existing software comprises a reader capable of parsing the identifier to extract the web link, and the pre-existing software also includes a web browser which will open the parsed web link to initiate the location transmission and subsequent payment interaction between the customer and the server.

13. The method of claim 1, wherein a customer mobile device contains a locally installed application for communication with the server and facilitation of the method.

14. The method of claim 1, wherein the transaction gateway is integrated within the server.

15. The method of claim 1, wherein the transaction gateway is external and in communication with the server via the network connection.

16. A server configured for use in the processing of payments for at least one location-based sales venue containing a plurality of customer locations and at least one network-connected venue-associated POS system, wherein each customer location has a physical identity target attached in proximity thereto comprising a unique system-wide identifier readable by mobile customer devices, the server comprising:
   a) a non-transient computer-readable storage medium having executable instructions, being a payment processing software component, embodied thereon;
   b) one or more hardware processors configured to execute the instructions;
   c) a network interface capable of two-way communication via at least one data network with mobile customer devices as well as with all of the venue-associated POS systems;
   d) a transaction gateway through which customer payments can be processed; and
   e) a location database comprising a venue record corresponding to each location-based sales venue and containing venue payment details via which payments to the venue can be electronically processed by a transaction gateway and network address details for each venue-associated POS system by which the server can communicate with same, and a location record corresponding to each physical customer location in each managed venue and containing the unique system-wide identifier of the associated physical identity target and identification of the venue-associated POS system affiliated with the customer location;

said server operable to:
   f) in a customer-initiated payment step, facilitate a desired payment transaction by a customer seeking to pay the outstanding service bill in respect of at least one selected customer location by:
      i) receiving at the server a location transmission containing the identifier of the physical identity target of the at least one selected customer location from a customer mobile device having read and captured the identifier;
      ii) parsing the location transmission to extract the received identifier of the physical identity target for each of the at least one selected customer locations contained therein;
      iii) selecting the location records corresponding to each selected customer location by matching the received identifiers with the details of associated identifiers stored within the location records;
      iv) querying the venue-associated POS system for each selected customer location to obtain the required payment details and determining the total payment amount required from the customer;
      v) receiving customer payment method details from the mobile customer device of the customer;
      vi) triggering a payment transaction for the total payment amount via the transaction gateway using the customer payment method details from the mobile customer device and the venue payment details from the venue record associated with the selected customer locations; and
      vii) on completion of the payment transaction, transmitting a payment completion indication in respect of the selected customer locations to each associated venue-associated POS system;
   wherein the system-wide identifier displayed on each identity target does not include any identifying information related to the location-based sales venue or customer location and is not repeated between any two customer locations; and
   wherein each physical identity target contains no human-readable indication of the location-based sales venue or the customer location.

17. The server of claim 16, wherein at least one location-based sales venue is a food-location-based sales venue.

18. The server of claim 16, wherein the payment completion indication transmitted to the venue-associated POS system includes details of the total payment amount processed including discounts or gratuities.

19. The server of claim 16, wherein the number of venue-associated POS systems at a venue is one.

20. The server of claim 16, wherein the number of venue-associated POS systems at a venue is more than one and the location records corresponding to the managed venue do not all use the same venue-associated POS system.

21. The server of claim 16, wherein the identifier of a physical identity target will be read by pre-existing software on the customer mobile device, and the reading of the identifier will result in the initiation of a location transmission to the server.

22. The server of claim 21, wherein the server is a web server, the identifier contains a web link and the pre-existing software comprises a reader capable of parsing the identifier to extract the web link, and the pre-existing software also includes a web browser which will open the parsed web link to initiate the location transmission and subsequent payment interaction between the customer and the server.

23. The server of claim 16, wherein the transaction gateway is integrated within the server.

24. The server of claim 16, wherein the transaction gateway is external and in communication with the server via the network connection.

* * * * *